(12) United States Patent
Murai et al.

(10) Patent No.: US 9,300,831 B2
(45) Date of Patent: Mar. 29, 2016

(54) INFORMATION PROCESSING APPARATUS, METHOD, AND RECORDING MEDIUM

(71) Applicant: PFU LIMITED, Kahoku-shi, Ishikawa (JP)

(72) Inventors: Chieko Murai, Kahoku (JP); Mitsuhiro Iwase, Kahoku (JP); Masato Izumi, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 0 days.

(21) Appl. No.: 14/158,105

(22) Filed: Jan. 17, 2014

(65) Prior Publication Data

US 2014/0320935 A1 Oct. 30, 2014

(30) Foreign Application Priority Data

Apr. 24, 2013 (JP) .................. 2013-091647

(51) Int. Cl.
- G06F 15/00 (2006.01)
- G06K 15/00 (2006.01)
- H04N 1/04 (2006.01)

(52) U.S. Cl.
CPC .......... H04N 1/04 (2013.01); *H04N 2201/0434* (2013.01)

(58) Field of Classification Search
None
See application file for complete search history.

(56) References Cited

U.S. PATENT DOCUMENTS

| 2005/0232656 A1* | 10/2005 | Asai et al. ............. 399/130 |
| 2007/0177209 A1* | 8/2007 | Ishibashi et al. ........ 358/1.18 |
| 2007/0187884 A1* | 8/2007 | Osawa ................ 270/1.01 |
| 2007/0229901 A1* | 10/2007 | Kusakabe ............. 358/1.18 |
| 2009/0290169 A1* | 11/2009 | Kobashi ............... 358/1.2 |

FOREIGN PATENT DOCUMENTS

| JP | 2002-157274 A | 5/2002 |
| JP | 2010-224698 A | 10/2010 |
| JP | 2011-130266 A | 6/2011 |

OTHER PUBLICATIONS

Miyagawa et al., "Automation of spine image generation in virtual bookshelf", Digital Library Journal, 2006, p. 25-38, DL Journal No. 30, Apr. 16, 2006.
http:www.geocities.jp/payaneco/usr/scanswap/howtotrim.html, Apr. 11, 2013.
http://www.lifehacker.jp/2012/06/120626simplestyle110.html, Jun. 26, 2012.
Miyagawa et al., "Automation of spine image generation in virtual bookshelf", Digital Library Journal, 2006, p. 1-5, DL Journal No. 30, Mar. 16, 2006.

* cited by examiner

*Primary Examiner* — Marivelisse Santiago Cordero
*Assistant Examiner* — Moustapha Diaby
(74) *Attorney, Agent, or Firm* — Westerman, Hattori, Daniels & Adrian, LLP

(57) ABSTRACT

An information processing apparatus is provided with a book data acquisition unit which acquires a book data item including a plurality of image data items related to covers and individual pages of a book, a length acquisition unit which acquires a longitudinal length and a lateral length of the book based on lengths of two sides of the plurality of image data items included in the book data item, and an image data determination unit which compares the longitudinal and lateral lengths of the book to the lengths of the two sides of each of the image data items to determine the image data item determined to include neither one page nor two facing pages as the image data item including a spine image.

11 Claims, 12 Drawing Sheets

INFORMATION PROCESSING APPARATUS, METHOD, AND RECORDING MEDIUM

CROSS-REFERENCE TO RELATED APPLICATION

This application is based upon and claims the benefit of priority of the prior Japanese Patent Application No. JP2013-091647, filed on Apr. 24, 2013, the entire contents of which are incorporated herein by reference.

FIELD

The disclosed invention relates to a technique for processing image data of a book.

BACKGROUND

Conventionally, it has been proposed to compare the shapes or sizes of a plurality of image data items read in a series of image reading processes to each other and allocate each of the read image data items to a spine, an index sheet, or a document or determine the image data item of the spine based on the aspect ratios of the image data items (Japanese Patent Application Laid-open No. 2010-224698).

In addition, a technique has been proposed which stores a cover collection file of document data items in association with the positions at which files are displayed in a file image consisting of a set of images of the files in a file storage device such as a cabinet or locker or a set of only appearance images of the files to allow a required document to be selected from the cover collection file (see Japanese Patent Application Laid-open No. 2002-157274).

Also, a technique has been proposed which places a medium on a platen with the spine surface thereof facing the platen, senses an image of the spine, measures the thickness of the medium from the image, and uses the value of the thickness of the medium actually measured from the image as a storage amount (see Japanese Patent Application Laid-open No. 2011-130266).

Besides, a device for sensing the image of a spine (see "Automation of spine image generation in virtual bookshelf", Takuya Miyagawa and two others, [online], Mar. 16, 2006, Digital Library, [retrieved from the Internet on Apr. 11, 2013] at <http://www.dl.slis.tsukuba.ac.jp/DLjournal/No_30/3-miyagawa/3-miyagawa.html> and software for manually specifying a region in an image and cutting out the image of a spine (see "How to use 'cover trimming function' of Scan-Swap", [online], [retrieved from the Internet on Apr. 11, 2013] at <http:www.geocities.jp/payaneco/usr/scanswap/howtotrim.html> and "'backMaker' for making spine and front cover from image file", Kaoru Misaki, the 110-th installment of SimpleStyle, [online], Jun. 26, 2012, lifehacker, [retrieved from the Internet on Apr. 11, 2013] at <http://www.lifehacker.jp/2012/06/120626simplestyle110.html>) have been used.

SUMMARY

An example of an information processing apparatus according to the disclosed invention is an information processing apparatus including a book data acquisition unit which acquires a book data item including a plurality of image data items related to covers and individual pages of a book, a length acquisition unit which acquires a longitudinal length and a lateral length of the book based on lengths of two sides of the plurality of image data items included in the book data item, and an image data determination unit which compares the longitudinal and lateral lengths of the book to the lengths of the two sides of each of the image data items to determine the image data item determined to include neither one page nor two facing pages as the image data item including a spine image.

The disclosed invention can also be understood as a method to be executed by a computer or a program to be executed by a computer.

The disclosed invention can also be understood as a recording medium which is readable by a computer or another device, machine, or the like and which records thereon such a program.

Here, a recording medium which is readable by a computer or the like refers to a recording medium in which information such as data or a program is stored by an electrical, magnetic, optical, mechanical, or chemical operation and from which the information can be read from a computer or the like.

DESCRIPTION OF EMBODIMENTS

An example embodiment of an information processing apparatus, a method, and a program each according to the disclosed invention will be described below based on the drawings.

However, the example embodiment described below is only illustrative of an embodiment and does not limit the information processing apparatus, the method, and the program each according to the disclosed invention to a specific configuration described below. In implementing the disclosed invention, a specific configuration in accordance with the embodiment is used appropriately, and various changes and modifications may be made therein.

In the present embodiment, a description will be given of the example embodiment when the information processing apparatus, the method, and the program each according to the disclosed invention are implemented in a system for document management. However, the information processing apparatus, the method, and the program each according to the disclosed invention can be used widely for a technique which processes image data, and an object to which the disclosed invention is to be applied is not limited to the example shown in the present embodiment.

<Configuration of System>

Figure 1:
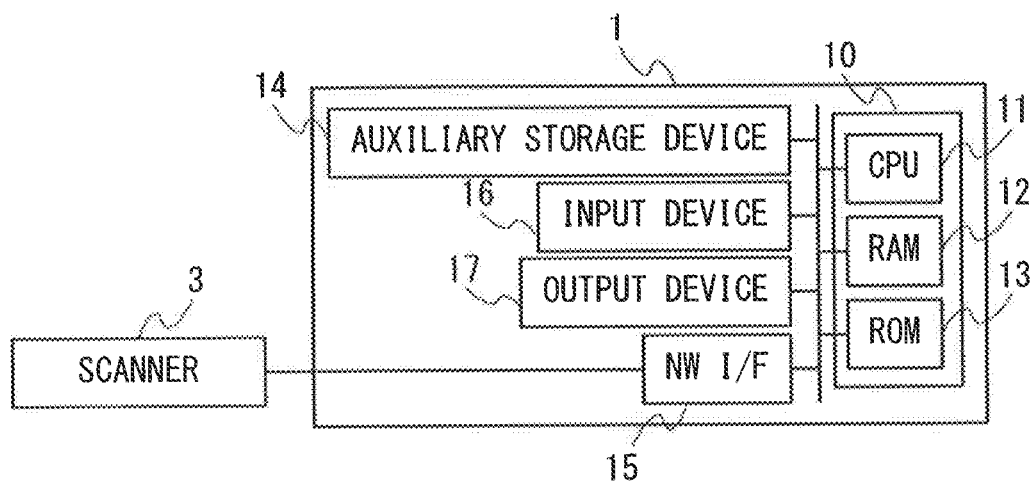
FIG. 1 is a view showing the outline of a configuration of a system according to an embodiment.

FIG. 1 is a view showing the outline of a configuration of a system according to the present embodiment. The system according to the present embodiment includes an information processing apparatus 1, and a scanner 3. The scanner 3 is communicatively connected to the information processing apparatus 1. Here, for the connection between the information processing apparatus 1 and the scanner 3, the connection interface of a peripheral device may be used or a network connection interface may be used. For example, for the connection between the information processing apparatus 1 and the scanner 3, a universal serial bus (USB), the IEEE 1394, a local area network (LAN), the Internet, or the like can be used.

The information processing apparatus 1 includes a control unit 10 including a central processing unit (CPU) 11, a random access memory (RAM) 12, a read only memory (ROM) 13, and the like, an auxiliary storage device 14, a communication interface 15, an input device 16 such as a keyboard, a mouse, or a touch panel, and an output device 17 such as a display. However, with regard to a specific hardware configuration of the information processing apparatus 1, omission, replacement, or addition can be made in accordance with the example embodiment.

In the information processing apparatus 1 according to the present embodiment, a document management program for managing electronic documents is installed. Through the execution of the document management program by the control unit 10, the information processing apparatus 1 operates as a document management system. The electronic documents such as book data items managed by the information processing apparatus 1 can be acquired using, e.g., the scanner 3.

The scanner 3 is a device which acquires data such as image data by sensing an image of (scanning) a target object such as a book and transmits the acquired data to the information processing apparatus 1. As the scanner 3, various types of scanners may be used. A method used for the scanner used to acquire the book data is not limited to the method shown by way of example in the present embodiment. For example, a so-called overhead scanner, a sheet feed scanner, a flatbed scanner, or the like can be used.

The overhead scanner is a scanner using a method which senses an image of a target object placed on a platen using an image sensing device held over the platen. The sheet feed scanner is a scanner using a method which places a plurality of sheet-like media as target objects in stacked relation on a platen and senses an image of each of the sheet-like media, while transporting the sheet-like media one by one. The flatbed scanner is a scanner using a method which places a target object such that the target object comes in contact with a reading surface provided with an image sensing device and senses an image thereof from the reading surface. The overhead scanner or the flatbed scanner allows the image to be sensed without cutting a book. The sheet feed scanner cuts the book and places the cut book on the platen to allow images of a plurality of pages to be automatically sensed without performing the operation of turning pages. Variations of the image data items that can be acquired using the various types of scanners will be described later using FIGS. 3 to 7.

Figure 2:
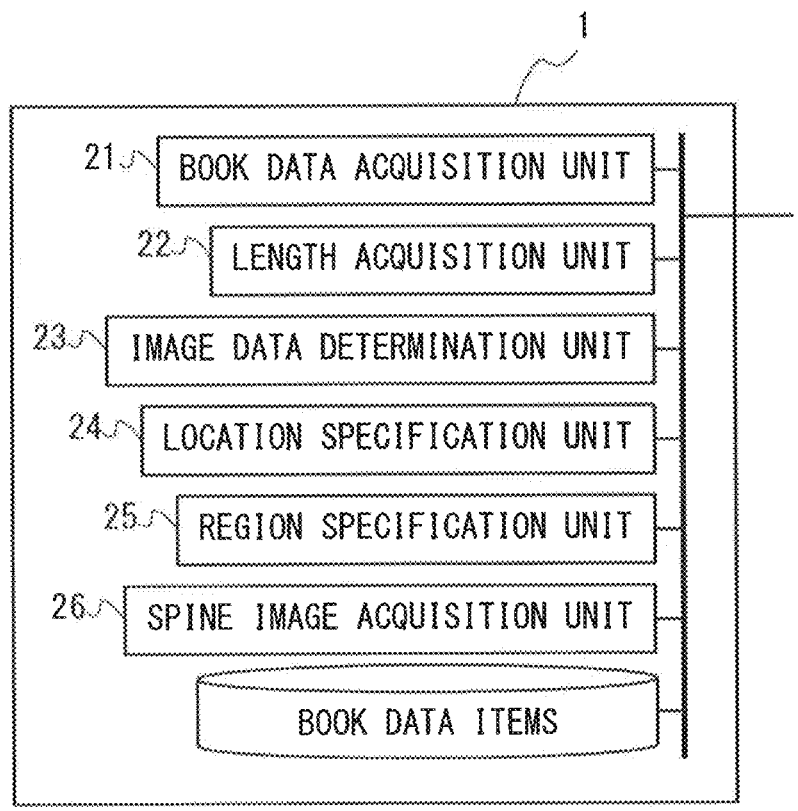
FIG. 2 is a view showing the outline of a functional configuration of an information processing apparatus according to the embodiment.
Figure 3:
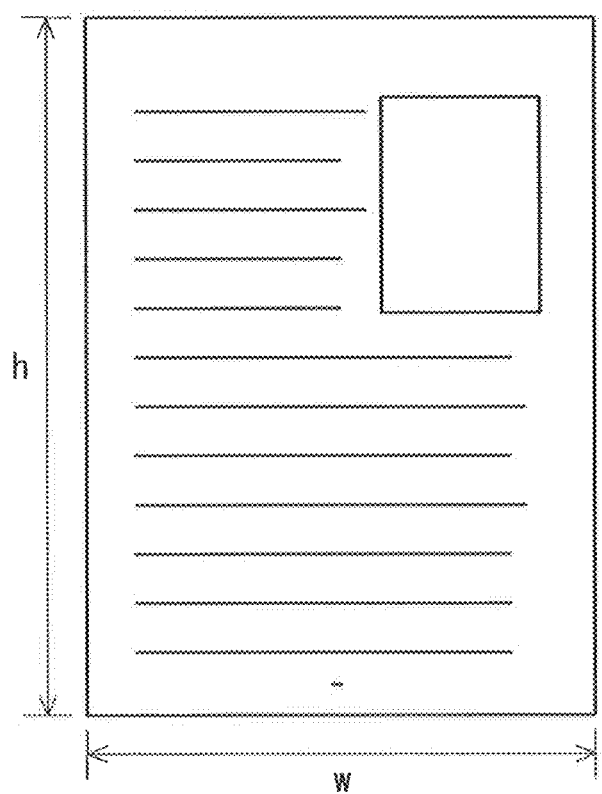
FIG. 3 is a view showing an image data item about one page of a book which may be included in a book data item according to the embodiment.
Figure 4:
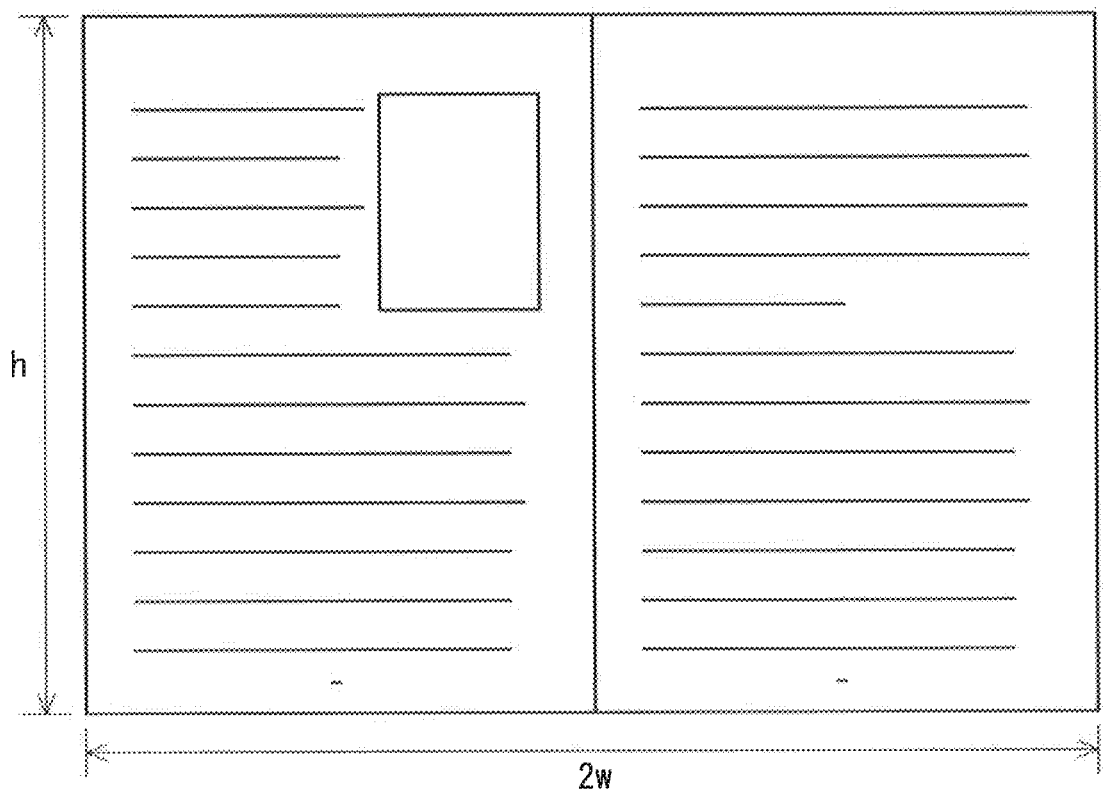
FIG. 4 is a view showing an image data item about two facing pages of the book which may be included in the book data item according to the embodiment.
Figure 5:
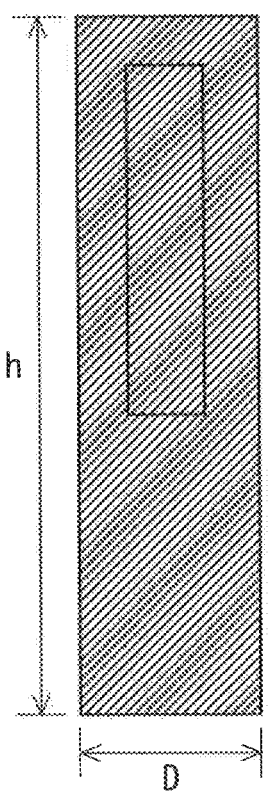
FIG. 5 is a view showing an image data item of the spine of the book which may be included in the book data item according to the embodiment.
Figure 6:
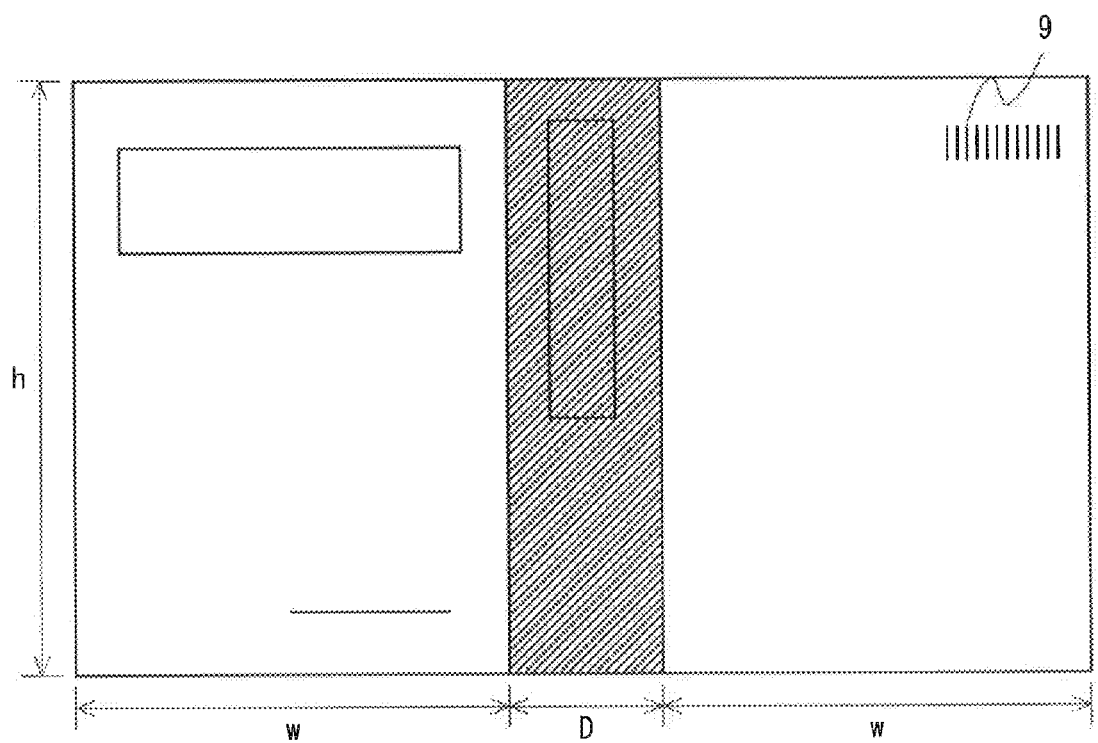
FIG. 6 is a view showing an image data item including the front cover, spine, and back cover of the book which may be included in the book data item according to the embodiment.

FIG. 2 is a view showing the outline of a functional configuration of the information processing apparatus 1 according to the present embodiment. In the information processing apparatus 1 according to the present embodiment, the CPU 11 interprets and executes the various programs developed in the RAM 12 to control various hardware items provided in the information processing apparatus 1. This allows the information processing apparatus 1 to function as an information processing apparatus including a book data acquisition unit 21, a length acquisition unit 22, an image data determination unit 23, a location specification unit 24, a region specification unit 25, and a spine image acquisition unit 26. In the present embodiment, the description has been given of the example in which each of such functions is executed by the versatile CPU 11, but some or all of such functions may also be implemented by one or a plurality of dedicated processors.

The book data acquisition unit 21 acquires a book data item including a plurality of image data items related to the covers and individual pages of a book. In the present embodiment, the description is given of the case where the book data item is acquired from an output from the scanner 3, but the book data item may also be obtained from a source other than the scanner 3. For example, the book data item may also be acquired by being downloaded from a device such as a server via a network such as the Internet or may also be acquired by being read from a portable computer-readable recording medium. The acquired book data item is stored in the auxiliary storage device 14.

Note that, in the present embodiment, the book data acquisition unit 21 or the scanner 3 performs automatic manuscript range sensing and automatic trimming with respect to an output resulting from scanning. The automatic manuscript range sensing is a process which specifies a range including a sensed image of a manuscript such as a book in the output resulting from image sensing (scanning). For example, through detection of an edge, determination of a focus, or the like, the range including the sensed image of the manuscript and a range including a sensed image of an object other than the manuscript (e.g., the platen of the overhead scanner or the manuscript presser of the flatbed scanner) are specified. The automatic trimming is a process which removes the range including the sensed image of the object other than the manuscript from the output resulting from image sensing. By the automatic trimming, an image data item having the sensed image of the manuscript even in the end portion thereof is generated. In the case where the image of the book is sensed without cutting the book, a distortion may occur in the middle portion between two facing pages or the like. In the present embodiment, the book data acquisition unit 21 or the scanner 3 may also perform automatic correction with respect to such a distortion and generate a corrected image data item.

Note that, in the present embodiment, the book data item includes the longitudinal length (height) and lateral length (width) of an image for each of the image data items included in the book data item. The longitudinal and lateral lengths of an image show the real size of an object subjected to image sensing as the source of the image data item. For example, the longitudinal and lateral lengths of the image can be acquired at the time of scanning using the scanner 3.

The book data item may also include information (hereinafter referred to as "page-turn direction information") showing the direction in which a page is turned when the book related to the book data item is read by a user. The page-turn direction information may be set manually by the user or automatically by the scanner 3 or the information processing apparatus 1. For example, when the scanner 3 is the overhead scanner, the scanner 3 can sense the direction in which the user turns a page of the book placed on the platen and automatically acquire the page-turn direction. At this time, for the sensing of the page-turn direction, the image sensing device of the scanner 3 may be used or another sensor may also be used. In addition, the information processing apparatus 1 or the scanner 3 acquires, from the image data item obtained from two facing pages, the page numbers thereof using an optical character recognition (OCR) technique and compares the respective pages assigned to the left and right pages to each other to be able to automatically acquire the page-turn direction of the book. When the page number of the left one of the two facing pages is smaller than the page number of the right one thereof, it can be determined that the page-turn direction is from right to left (the book is left-bound/left-open). On the other hand, when the page number of the left one of the two facing pages is larger than the page number of the right one thereof, it can be determined that the page-turn direction is from left to right (the book is right-bound/right-open).

The length acquisition unit 22 acquires the longitudinal length (height) and lateral length (width) of the book based on the lengths of the two sides of the plurality of image data items included in the book data item. More specifically, the length acquisition unit 22 acquires information about the lengths of the two sides of each of the image data items included in the book data item and acquires, as the longitudinal length (height) of the book, the lengths of either side of the two sides of the plurality of image data items, the lengths being approximate to each other in the image data items the amount of which is not less than a given reference (e.g., all the image data items).

Figure 7:
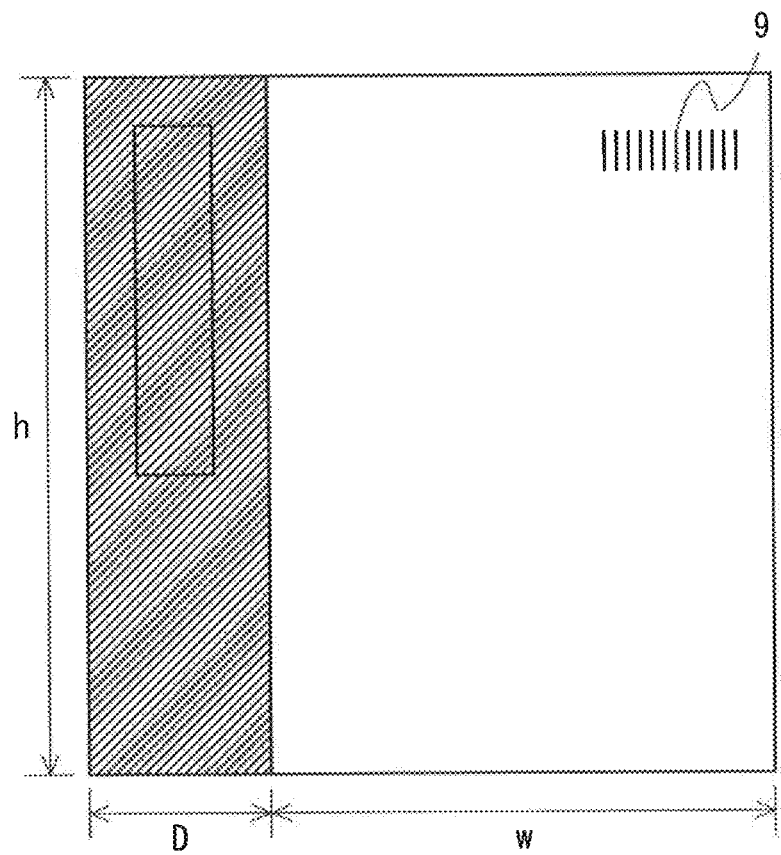
FIG. 7 is a view showing an image data item including the front or back cover and spine of the book which may be included in the book data item according to the embodiment.

FIGS. 3 to 7 are views showing the image data item of one page of the book (see FIG. 3), the image data item of two facing pages thereof (see FIG. 4), the image data item of the spine thereof (see FIG. 5), the image data item including the front cover, spine, and back cover thereof (see FIG. 6), and the image data item including the front cover or back cover and spine thereof (see FIG. 7). The length acquisition unit 22 acquires information about the lengths of the two sides of these image data items and acquires, as a longitudinal length h of the book, the lengths approximate to each other in the image data items the amount of which is not less than a given reference (which are all the image data items herein). Note that, in this case, the lengths of each of the image data items may differ due to an error occurred in scanning or to the sizes of the covers which are slightly larger than those of the inner pages. Accordingly, when the lengths of the individual image data items are compared to each other, the length acquisition unit 22 sets a predetermined tolerance (of, e.g., 7%) so as to be able to determine that each of the approximate lengths is related to the same side. Here, the description has been given of the case where the image data items meeting the requirement of "the image data items the amount of which is not less than a given reference" is "all". However, the requirement of "the image data items the amount of which is not less than a given reference" may also be met by other image data items. For example, the requirement of "the image items the amount of which is not less than a given reference" may also be met by "the majority of" image data items. When the majority of image data items have the approximate lengths, the lengths have the high possibility of corresponding to the longitudinal length of the book. This is because, in a normal book, a length which is constant in each of the covers, spine, and pages of the book is a longitudinal length.

In addition, the length acquisition unit 22 acquires, as the lateral length of the book, the length or half the length of the one of the two sides of each of the plurality of image data items which is not acquired as the longitudinal length w of the book. More specifically, the length acquisition unit 22 assumes the one of the lengths of the two sides of each of the image data items which has not been acquired as the longitudinal length as the lateral length of the image data item (e.g., w in FIG. 3, 2w in FIG. 4, D in FIG. 5, 2w+D in FIG. 6, or w+D in FIG. 7). Then, the length acquisition unit 22 compares the lateral lengths of the plurality of image data items included in the book data item to each other. If there are lengths in the plurality of image data items which are approximate to each other when not multiplied at all or doubled, the length acquisition unit 22 acquires each of the lengths as the lateral length w of the book.

The image data determination unit 23 compares the longitudinal and lateral lengths of the book to the lengths of the two sides of each of the image data items to determine the image data item that has been determined to include neither one page nor two facing pages as the image data item including a spine image. More specifically, the image data determination unit 23 determines that the image data item in which the length of one of the two sides is approximate to the longitudinal length of the book, but the length of the other of the two sides is approximate to neither the lateral length of the book nor double the lateral length thereof as the image data item including the spine image. For example, in the examples of the image data items shown in FIGS. 3 to 7, in each of the image data items shown in FIGS. 5 to 7, the length of one of the two sides is approximate to the longitudinal length h of the book, but the length of the other of the two sides is approximate to neither the lateral length w of the book nor a length (2w) which is double the lateral length thereof so that the image data item is determined to be the image data item including the spine image.

The location specification unit 24 specifies, based on the page-turn direction information showing the direction in which a page of the book is turned, the right or left side on which the front cover or the back cover is located in the image data item including the spine image. More specifically, the location specification unit 24 acquires the page-turn direction information included in the book data item and specifies, when the page turn direction is from right to left (the book is left-bound/left open), that the front cover is located on the right side of the spine and the back cover is located on the left side of the spine. On the other hand, when the page-turn direction is from left to right (the book is right-bound/right-open), the location specification unit 24 specifies that the front cover is located on the left side of the spine and the back cover is located on the right side of the spine. However, depending on the image data item obtained by scanning, the image may be turned upside down. Accordingly, the determination process by the location specification unit 24 is preferably performed in combination with a process of determining the up/down sides of the image, a process of estimating the cover data based on the order of the image data items included in the book data item (estimating the image data item that has appeared first in the book data item as the image data item including the front cover), or the like. The determination of the up/down sides of the image can be made by a method which performs, e.g., an OCR process while changing the direction of the image and determines the success/failure of the OCR process, or the like.

The region specification unit 25 specifies the region of the spine image (hereinafter referred to also as the "spine region") in the image data item including the spine image based on information such as the lateral length of the book. Specifically, when the lateral length of the image data including the spine image is less than the lateral length of the book, the region specification unit 25 specifies the whole image data item as the region of the spine image. For example, in the image data item shown in FIG. 5, the lateral length (depth of the book) D is less than the lateral length w of the book so that the whole image data item is specified as the region of the spine image.

When the lateral length of the image data item including the spine image is more than double the lateral length of the book, the region specification unit 25 specifies a region left by removing an image corresponding to the lateral length of the book from each of both sides of the image data item as the region of the spine image. For example, in the image data item shown in FIG. 6, the lateral length w+D+w is more than double the lateral length w of the book so that the region (hatched region shown in the drawing) left by removing the image corresponding to the lateral length w of the book from each of both sides of the image data item is specified as the region of the spine image.

When the lateral length of the image data item including the spine image is more than the lateral length of the book and less than double the lateral length of the book, the region specification unit 25 specifies, as the region of the spine image, the region left by removing the image corresponding to the lateral length of the book from the side specified in the image data item by the location specification unit 24. For example, in the image data item shown in FIG. 7, the lateral length D+w is more than the lateral length w of the book and less than double the lateral length of the book so that the region (hatched region shown in the drawing) left by removing the image corresponding to the lateral length w of the book from the side specified by the location specification unit 24 is specified as the region of the spine image. Note that the process according to the present embodiment is performed on the assumption that the thickness (depth) D of the book does not exceed the width w of the book (i.e., D<w is satisfied).

Here, the "side specified by the location specification unit 24" is the right side of the image data item when the image data item includes the front cover of the "left-bound/left-open book", while the "side specified by the location specification unit 24" is the left side of the image data item when the image data item includes the back cover of the "left-bound/left-open book". On the other hand, the "side specified by the location specification unit 24" is the left side of the image data item when the image data item includes the front cover of the "right-bound/right-open book", while the "side specified by the location specification unit 24" is the right side of the image data item when the image data item includes the back cover of the "right-bound/right-open book".

Note that, to more precisely specify the region of the spine image, the region specification unit 25 may also perform the detection of the boundary between the front cover or the back cover and the spine based on image analysis in combination with the process using the lateral length w of the book described above. For example, the region specification unit 25 subjects the region specified by the process described above and its vicinity to image analysis, detects the boundary with the background color, the line thereof, and the like, and corrects the region in accordance with the detection result to be able to more precisely specify the region of the spine image.

The spine image acquisition unit 26 cuts out the region specified by the region specification unit 25 from the image data item including the spine image to acquire the image data item of the spine. In each of the examples shown in FIGS. 5 to 7, the hatched portion is specified as the region of the spine image so that the hatched portion is cut out and the image data item of the spine is acquired.

<Flows of Processes>

Next, the details of the processes according to the present embodiment will be described. Note that the specific contents of the processes described in the present embodiment, the order thereof, and the like are illustrative in performing the processes. The specific contents of the processes, the specific order thereof, and the like may be selected appropriately in accordance with the example embodiment.

Figure 8:
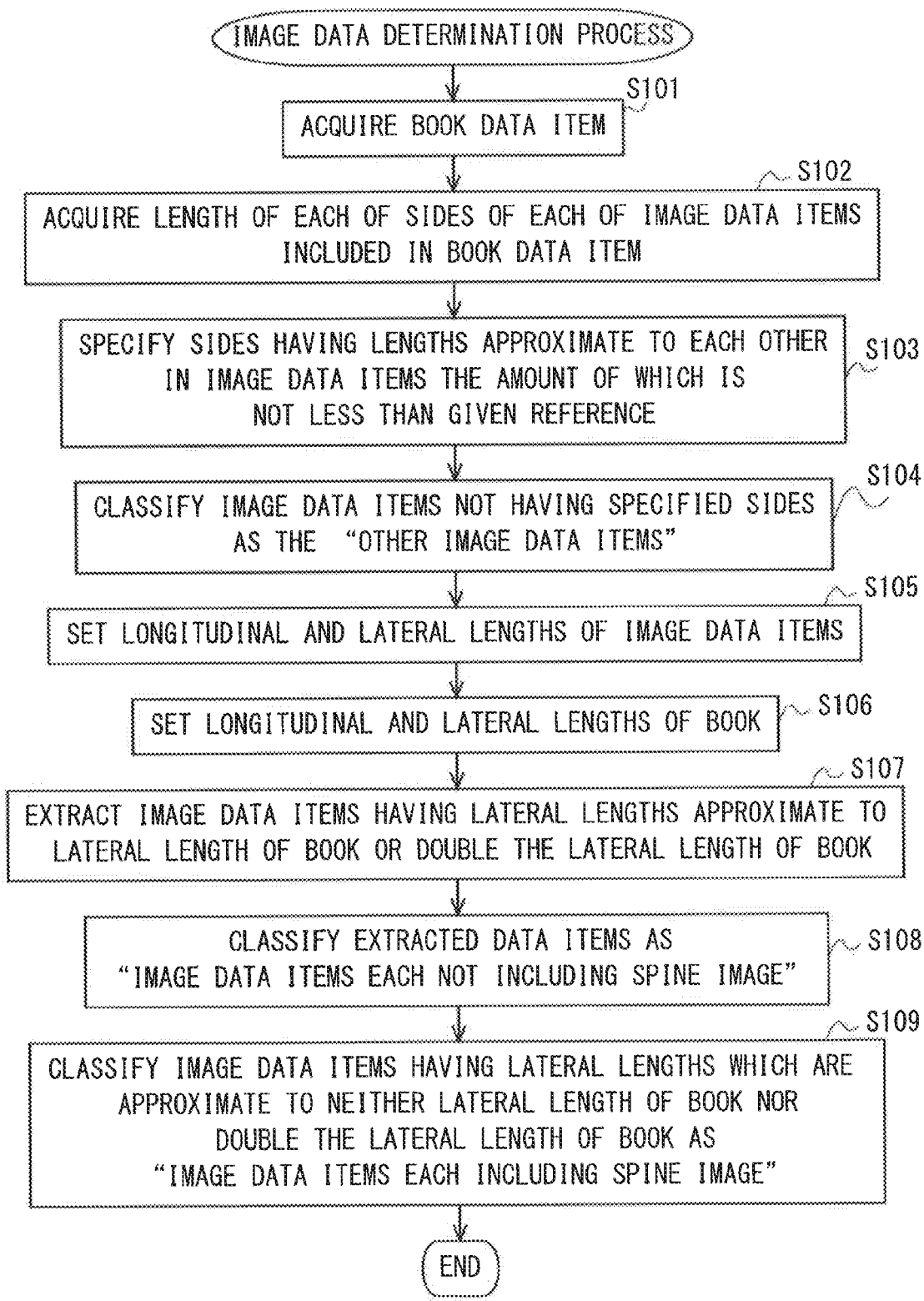
FIG. 8 is a flow chart showing the flow of an image data determination process according to the embodiment.

FIG. 8 is a flow chart showing the flow of an image data determination process according to the present embodiment. The image data determination process shown in the present flow chart is started upon output of the book data item resulting from scanning with the scanner 3 to the information processing apparatus 1.

In Step S101, the book data item is acquired. When the user scans a book using the scanner 3 and the book data item resulting from the scanning with the scanner 3 is output to the information processing apparatus 1, the book data acquisition unit 21 acquires the book data item including a plurality of image data items related to the covers and individual pages of the book from the output from the scanner 3. Then, the process advances to Step S102.

In Steps S102 and S103, the respective lengths of the sides of the image data items included in the book data item are acquired, and the sides having the lengths approximate to each other in the image data items the amount of which is not less than a given reference are specified. The length acquisition unit 22 acquires, from each of the image data items included in the book data item, the respective lengths of the sides of the image data item (Step S102). Then, the length acquisition unit 22 compares the lengths of the sides of the plurality of acquired image data items to each other to specify the sides having the lengths approximate to each other in the image data items the amount of which is not less than a given reference (e.g., all the image data items) (Step S103). Thereafter, the process advances to Step S104.

In Step S104, the image data items not having the "sides having the lengths approximate to each other in the image data items the amount of which is not less than a given reference" are classified as the "other image data items". The image data determination unit 23 classifies the image data items not having the "sides having the lengths approximate to each other in the image data items the amount of which is not less than a given reference" that have been specified in Step S103 as the "other image data items" which are neither the image data items of the covers nor the image data items of the pages in the book. This is because the "sides having the lengths approximate to each other in the image data items the amount of which is not less than a given reference" are each estimated to have the longitudinal length of the book and the image data items which do not have such sides can be estimated to be neither the image data items of the covers nor the image data items of the pages in the book. Thereafter, the process advances to Step S105.

In Step S105, the longitudinal and lateral lengths of the image data items are set. Specifically, the length acquisition unit 22 sets, for each of the image data items, the length of each of the "sides having the lengths approximate to each other in the image data items the amount of which is not less than a given reference" that have been specified in Step S103 as the longitudinal length of the image data item and the length of the other of the two sides of each of the image data items which has not been acquired as the longitudinal length as the lateral length of the image data item. Thereafter, the process advances to Step S106.

In Step S106, the longitudinal and lateral lengths of the book are set. The length acquisition unit 22 determines the longitudinal length of the book based on the lengths approximate to each other that have been set as the respective longitudinal lengths of the image data items in Step S105. Here, the longitudinal length of the book may be determined appropriately to be a length approximate to the respective longitudinal lengths of the image data items. For example, any of the longitudinal lengths of the plurality of image data items may be determined to be the longitudinal length of the book, or a length calculated by averaging the longitudinal lengths of the plurality of image data items may be determined to be the longitudinal length of the book. Alternatively, it may also be possible that a plurality of standard longitudinal lengths of books (hereinafter referred to as the "standard longitudinal lengths") are held in advance and the one of the standard longitudinal lengths which is most approximate to the longitudinal lengths of the plurality of image data items is determined to be the longitudinal length of the book.

The length acquisition unit 22 also compares the lateral lengths of the plurality of image data items included in the book data item to each other. If there are the lengths which are approximate to each other when not multiplied at all or doubled in the plurality of image data items, the length acquisition unit 22 acquires each of the lengths as the lateral length w of the book. Thereafter, the process advances to Step S107.

In Steps S107 and S108, the image data items having the lateral lengths which are approximate to the lateral length of the book or to double the lateral length of the book are extracted and classified as the image data items each not including the spine image. The image data determination unit 23 extracts the image data items in each of which the length of one of the two sides is approximate to the longitudinal length of the book and the length of the other of the two sides is approximate to the lateral length of the book or double the lateral length thereof as the image data items (image data items related to the pages in the book and to only the front cover or back cover thereof) each not including the spine image (Step S107) and classifies the image data items as the "image data items each not including the spine image" (Step S108).

In Step S109, the image data items having the lateral lengths which are approximate to neither the lateral length of the book nor double the lateral length thereof are classified as the image data items each including the spine image of the book. The image data determination unit 23 determines the image data items in each of which the length of one of the two sides is approximate to the longitudinal length of the book, but the length of the other of the two sides is approximate to neither the lateral length of the book nor double the lateral length thereof as the image data items each including the spine image and classifies the image data items as the "image data items each including the spine image". Thereafter, the process shown in the present flow chart is ended.

Figure 9:
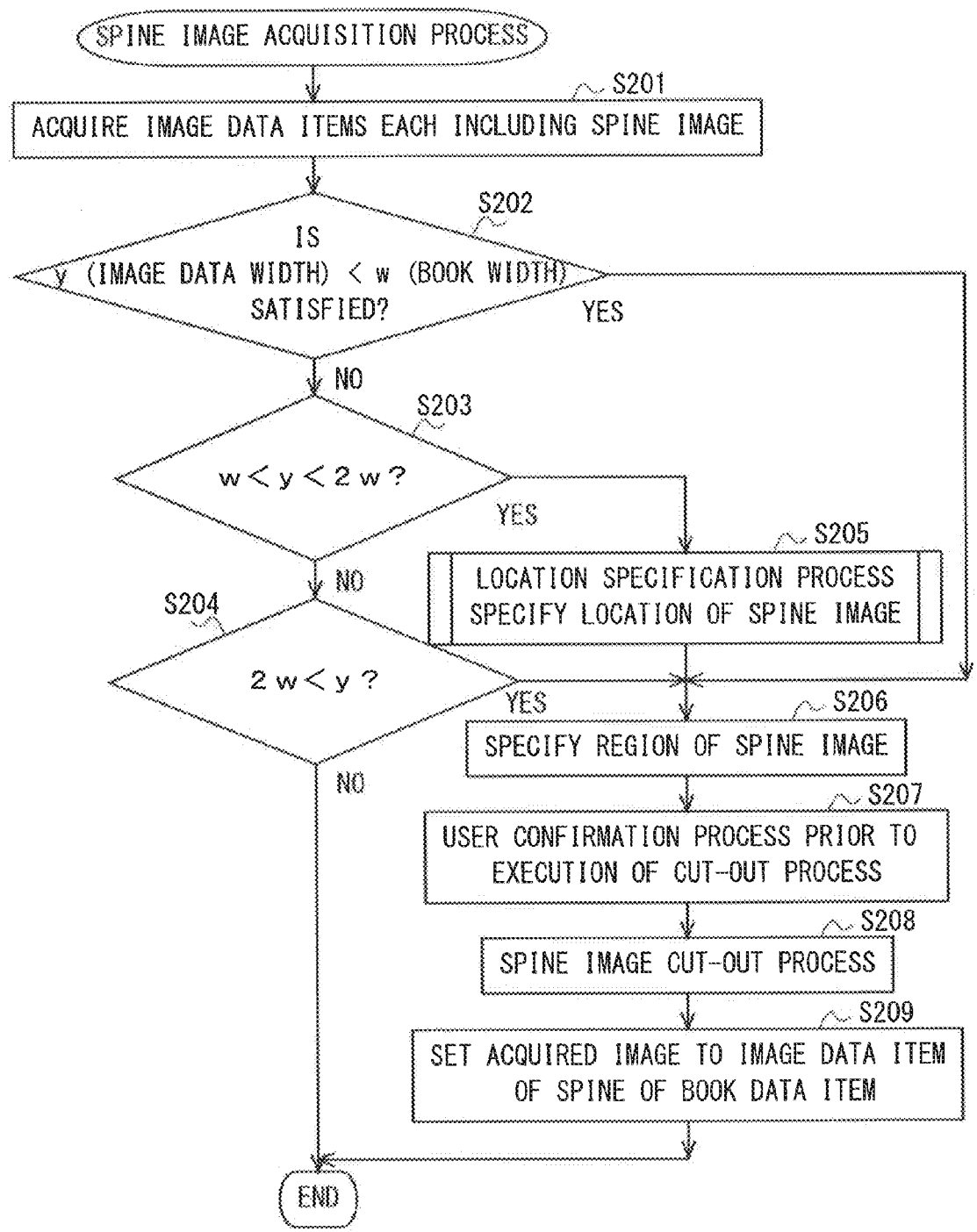
FIG. 9 is a flow chart showing the flow of a spine image acquisition process according to the embodiment.

FIG. 9 is a flow chart showing the flow of a spine image acquisition process according to the present embodiment. The spine image acquisition process shown in the present flow chart is started upon ending of the image data determination process shown in FIG. 8.

In Step S201, the image data items each including the spine image are acquired. Specifically, the spine image acquisition unit 26 acquires the image data items each including the spine image that have been specified in Step S109 from the book data item.

In Steps S202 to S204, a configuration of each of the image data items including the spine image is determined. Specifically, the region specification unit 25 compares a lateral length y of the image data item to the lateral length w of the book determined in Step S106 described above. When "y<w" is satisfied, the region specification unit 25 determines that the image data item is an image data item (see FIG. 5) of only the spine (Step S202). Here, when the image data item is determined to be the image data item of only the spine, the process advances to Step S206. In the present embodiment, to output a confirmation screen, the process is assumedly advanced to Step S206 even when the image data item is determined to be the image data item of only the spine. In this case, however, since the spine image cut-out process is unnecessary, the process may also be advanced to Step S209.

The region specification unit 25 compares the lateral length y of the image data item to the lateral length w of the book and the length 2w which is double the lateral length. When "w<y<2w" is satisfied, the region specification unit 25 determines that the image data item is an image data item (see FIG. 7) which is a combination of either one of the front and back covers and the spine (Step S203). Here, when the image data item is determined to be the image data item which is the combination of either one of the front and back covers and the spine, a determination of whether the spine is located on the right or left side of the image is needed so that the process advances to a location specification process in Step S205.

The region specification unit 25 further compares the lateral length y of the image data item to the length 2w which is double the lateral length of the book. When "2w<y" is satisfied, the region specification unit 25 determines that the image data item is an image data item (see FIG. 6) which is a combination of the spine, the front cover, and the back cover (Step S204). Here, when the image data item is determined to be the image data item which is the combination of the spine, the front cover, and the back cover, the process advances to Step S206.

Note that the order in which the determinations are made in Steps S202 to S204 is not limited to the order shown in the present embodiment. When the image data item is determined to be none of the image data item of only the spine, the image data item which is the combination of either one of the front and back covers and the spine, and the image data which is the combination of the front cover, the spine, and the back cover in the processes in Steps S202 to S204, the process shown in the present flow chart is ended.

In Step S205, the location of the spine image is specified. When it is determined that the image data item is the image data which is the combination of either one of the front and back covers and the spine (see Step S203), the location specification unit 24 specifies the right or left side on which the front cover or the back cover is located in each of the image data items including the spine image based on the page-turn direction information showing the direction in which a page of the book is turned. Note that the location specification process executed in the present step will be described in detail using FIG. 11. When the location of the spine image is specified, the process advances to Step S206.

When the book data item does not include the page-turn direction information, the process shown in Step S205 need not be performed. In this case, the right or left side on which the front cover or the back cover is located in the image data item including the spine image may be specified based on image analysis (e.g., detection of the boundary with the background color, the line thereof, and the like described above), OCR (e.g., detection of sales information described later), an input from a user, or the like.

In Step S206, the region of the spine image is specified. The region specification unit 25 specifies the region of the spine image in the image data item including the spine image based on the lateral length of the book. Here, when it has been determined in Step S202 that the image data item is the image data item (see FIG. 5) of only the spine, the region specification unit 25 specifies the whole image data item (hatched portion) as the region of the spine image. Otherwise, when it is determined in Step S203 that the image data item is the image data (see FIG. 7) which is the combination of either one of the front and back covers and the spine, the region specification unit 25 specifies, as the region of the spine image, the region (hatched portion) left by removing the image corresponding to the lateral length of the book from the right or left side specified in the image data item by the location specification unit 24. Otherwise, when it is determined in Step S204 that the image data item is the image data (see FIG. 6) which is the combination of the spine, the front cover, and the back cover, the region specification unit 25 specifies, as the region of the spine image, the region (hatched portion) left by removing the image corresponding to the lateral length of the book from each of both sides of the image data item. Thereafter, the process advances to Step S207.

In Step S207, a user confirmation process prior to the execution of the cut-out process is performed. The control unit 10 of the information processing apparatus 1 outputs the region of the spine image specified in Step S206 via the output device 17 such as a display to allow the user to confirm the region of the spine image and prompts the user to confirm the region of the spine image.

Figure 10:
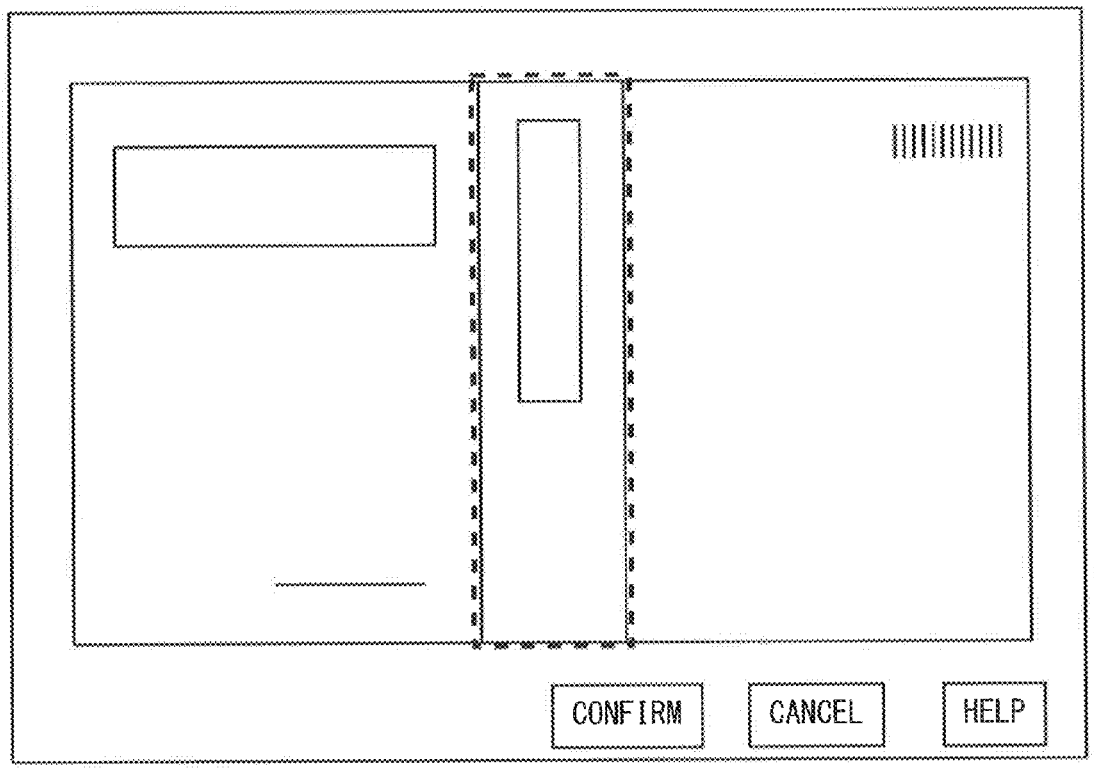
FIG. 10 is a view showing a user confirmation screen associated with the region of a spine image.

FIG. 10 is a view showing the user confirmation screen associated with the region of the spine image (spine region) according to the present embodiment. In FIG. 10, the spine region specified in Step S206 is shown in superimposed relation with the whole image data item including the spine image. In the example shown in FIG. 10, the spine region is shown by the broken-line frame. Note that the information processing apparatus 1 may also cause the user to edit the broken-line region using the input device 16 and thus allow the user to adjust the spine region. When a confirmation input from the user is received via the input device 16, the process advances to Step S208.

In Step S208, the spine image cut-out process is performed. The spine image acquisition unit 26 cuts out the region specified in Step S206 and adjusted as necessary in Step S207 from the image data item including the spine image to acquire the image data item of the spine. At this time, the control unit 10 may also calculate the size of the spine image. The size of the spine image can be calculated based on the size (longitudinal length and lateral length) of the "image data item including the spine image" before the cut-out process is performed and on the area occupied by the "region of the spine image" specified by the region specification unit 25 in the "image data item including the spine image". For instance, in the examples shown in FIGS. 6 and 7, the size (longitudinal length h*lateral length D) of the spine image is calculated based on the size (which is "longitudinal length h*lateral length 2w+D" in FIG. 6 and "longitudinal length h*lateral length w+D" in FIG. 7) of the "image data item including the spine image" and on the area (which is the area left after the region having the width w is removed from each of both sides in FIG. 6 and the area left after the region having the width w is removed from one side in FIG. 7) occupied by the region of the spine image. Thereafter, the process advances to Step S209.

In Step S209, the acquired image is set to the image data item of the spine of the book data item. The spine image acquisition unit 26 sets the image data item acquired in Step S208 or the image data item determined to be the image data item (see FIG. 5) of only the spine in Step S202 to the image data item of the spine in the book data item. When the size of the spine image has been calculated in Step S208, the control unit 10 may also set the size of the spine image to the book data item. Thereafter, the process shown in the present flow chart is ended.

Figure 11:
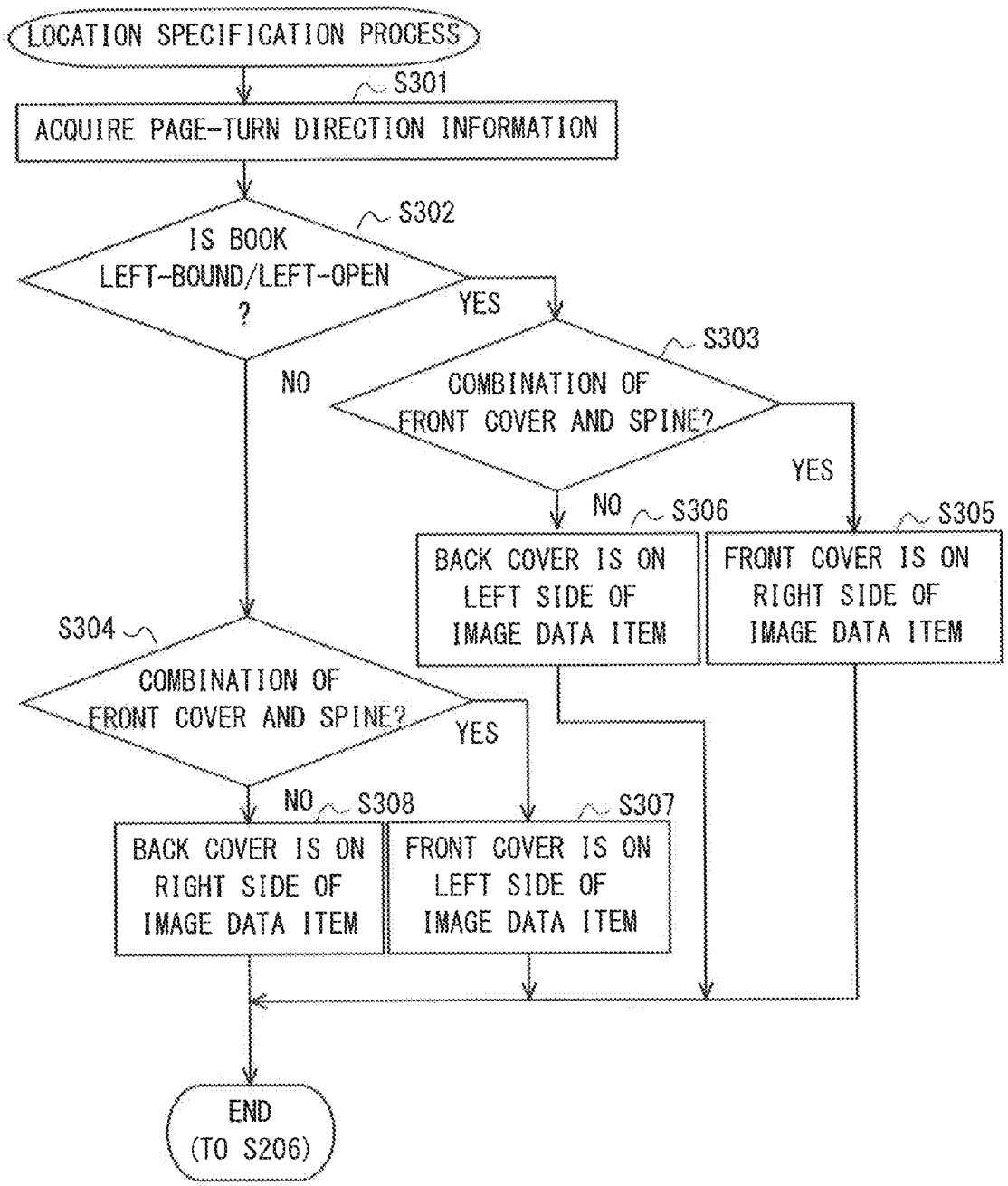
FIG. 11 is a flow chart showing the flow of a location specification process according to the embodiment.

FIG. 11 is a flow chart showing the flow of a location specification process according to the present embodiment. The location specification process shown in the present flow chart provides a detailed description of the process in Step S205 described above and is started upon determination in Step S203 that the image data item is the image data item which is the combination of the front cover or the back cover and the spine.

In Steps S301 to S304, the direction in which a page of the book is turned is determined, and it is further determined whether or not the target image data item includes a combination of the front cover and the spine. The location specification unit 24 acquires the page-turn direction information from the book data item related to the process (Step S301). Then, the location specification unit 24 references the acquired page-turn direction information to determine whether the direction in which a page of the book associated with the book data item is turned is from right to left (the book is left-bound/left-open) or left to right (the book is right-bound/right-open) (Step S302).

Then, the location specification unit 24 determines whether or not the target image data item includes the combination of the front cover and the spine (Steps S303 and S304). For the determination, various methods can be used. For example, when there are two image data items related to the covers in the book data item, the location specification unit 24 can estimate that the image data item which appears first in the sequence of the image data items in the book data item is the image data item including the front cover and estimate that the image data item which subsequently appears is the image data item including the back cover. When there are two image data items related to the covers in the book data item, the location specification unit 24 can also detect sales information 9 (see FIGS. 6 and 7) such as a barcode, estimate that the image data item having the sales information is the image data item including the back cover, and estimate that the image data item not having the sales information is the image data item including the front cover.

In the determination process in Steps S302 to S304, when it is determined that the target image data item is the image data item of the front and back covers of a left-bound/left-open book, the process advances to Step S305. Otherwise, when it is determined that the target image data item is the image data item of the back cover and spine of a left-bound/left-open book, the process advances to Step S306. On the other hand, when it is determined that the target image data item is the image data item of the front and back covers of a right-bound/right-open book, the process advances to Step S307. Otherwise, when it is determined that the target image data item is the image data item of the back cover and spine of a right-bound/right-open book, the process advances to Step S308.

In Steps S305 and S308, the location of the spine image is specified. Specifically, the location specification unit 24 specifies that the front cover or the back cover is located on the right side of the image data item. Thereafter, the process shown in the present flow chart is ended, and the main process advances to Step S206 in FIG. 9.

In Steps S306 and S307, the location of the spine image is specified. Specifically, the location specification unit 24 specifies that the front cover or the back cover is located on the left side of the image data item. Thereafter, the process shown in the present flow chart is ended, and the main process advances to Step S206 in FIG. 9.

Figure 12:
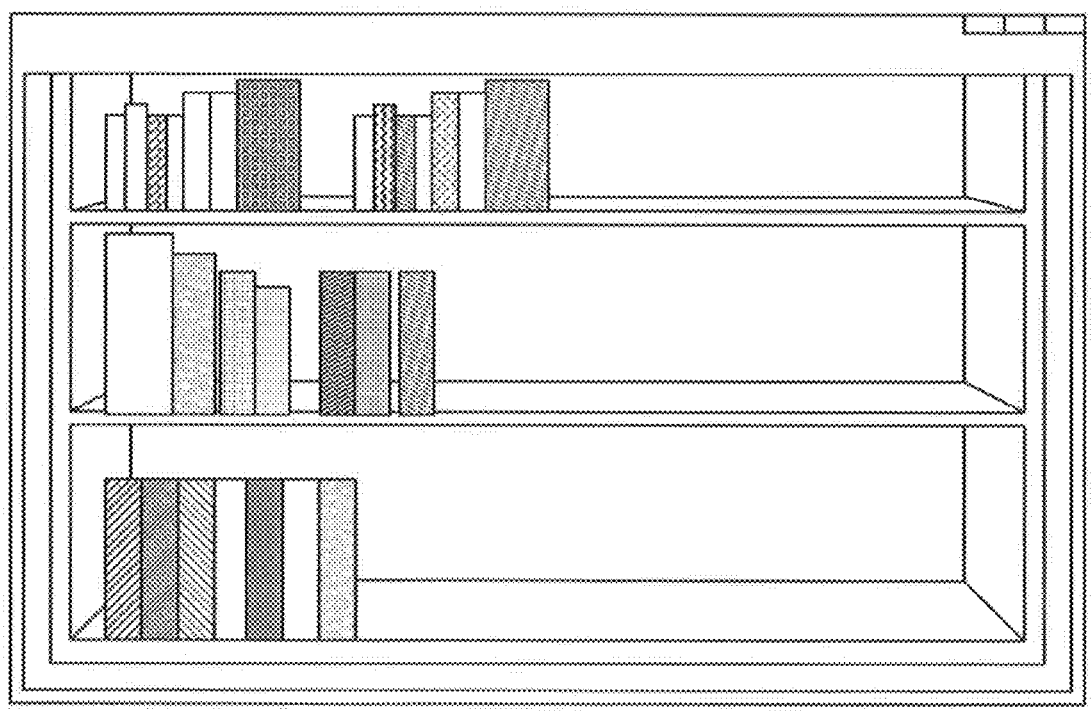
FIG. 12 is a view showing a screen displaying a plurality of book data items in accordance with a document management system according to the embodiment.

FIG. 12 is a view showing a screen displaying a plurality of book data items in accordance with a document management system according to the present embodiment. With the information processing apparatus, the method, and the program according to the present embodiment, it is possible to acquire the spine image of a book by a simple and easy operation and cause the spine image to be included in the book data item. Accordingly, when the plurality of book data items are displayed on a display screen virtually representing a bookshelf, the spine images in the book data items can be displayed side-by-side.

With the document management system shown in the present embodiment, the longitudinal and lateral lengths of a book are acquired based on the lengths of the two sides of each of the plurality of image data items in the book data item and the image data items which do not correspond to the longitudinal and lateral lengths are determined to be the image data items each including the spine image. Therefore, irrespective of the type of each of the image data items including the spine image, the region of the spine can be specified.

Also, in the present embodiment, when the spine image is acquired, the size information of the spine image may also be calculated and added to the book data item (see Steps S208 and S209 in FIG. 9). Consequently, with the document management system according to the present embodiment, when a plurality of book data items are displayed on a display or the like, the book data items can be displayed in sizes in accordance with the magnitude relationships between the real sizes of the books. Since such a display method improves the reproducibility of the thicknesses and heights of the books, the content of the display can be brought closer to that of a real bookshelf or cabinet to allow the user to easily find a target book.

What is claimed is:

1. A system, comprising:
   an image scanner that acquires a book data item including a plurality of image data items related to covers and individual pages of a book by scanning the book to sense an image of the book; and
   an information processing apparatus, comprising:
   a book data acquisition unit which acquires from the scanner the book data item including the plurality of image data items related to the covers and individual pages of a book;
   a length acquisition unit which acquires a longitudinal length and a lateral length of the book based on lengths of two sides of the plurality of image data items included in the book data item;
   an image data determination unit which compares the longitudinal and lateral lengths of the book to the lengths of the two sides of each of the image data items to determine the image data item as including a spine image when the image data item is neither one page nor two facing pages, wherein the spine image is identifying an external spine on a cover of the book;
   a region specification unit which specifies, based on the lateral length of the book, a region of the spine image in the image data item including the spine image; and
   a spine image acquisition unit which cuts out the specified region from the image data item including the spine image to acquire the image data item of the spine.

2. The system according to claim 1, wherein the image data determination unit determines, as the image data item including the spine image, the image data item in which the length of one of the two sides is approximate to the longitudinal length of the book, but the length of the other of the two sides is approximate to neither the lateral length of the book nor double the lateral length thereof, by comparing the longitudinal and lateral lengths of the book to the lengths of the two sides.

3. The system according to claim 1, wherein the length acquisition unit acquires, as the longitudinal length of the book, the lengths of either side of the two sides of the plurality of image data items, the lengths being approximate to each other in the image data items by an amount of which is not less than a given reference.

4. The system according to claim 3, wherein the length acquisition section acquires, as the lateral length of the book, the length or half of the length of the one of the two sides of each of the plurality of image data items which is not acquired as the longitudinal length.

5. The system according to claim 1, wherein, when the lateral length of the image data item including the spine image is less than the lateral length of the book, the region specification unit specifies the whole image data item as the region of the spine image.

6. The system according to claim 1, wherein, when the lateral length of the image data item including the spine image is more than double the lateral length of the book, the region specification unit specifies, as the region of the spine image, a region left by removing an image corresponding to the lateral length of the book from each of both sides of the image data item.

7. The system according to claim 1, wherein, when the lateral length of the image data item including the spine image is more than the lateral length of the book and less than double the lateral length of the book, the region specification unit specifies, as the region of the spine image, a region left by removing an image corresponding to the lateral length of the book from either one side of the image data item.

8. The system according to claim 7, further comprising:
   a location specification unit which specifies, based on page-turn direction information showing a direction in which a page of the book is turned, a right or left side on which a front cover or a back cover is located in the image data item including the spine image, wherein
   the region specification unit specifies, as the region of the spine image, a region left by removing the image corresponding to the lateral length of the book from the specified right or left side in the image data item including the spine image.

9. The system according to claim 1, wherein
   the book data item includes information about a longitudinal length and a lateral length of each of the image data items, and
   the length acquisition unit acquires, based on the information, the longitudinal and lateral lengths of the book.

10. A method, comprising:
    scanning a book with an image an image scanner that senses an image of the book to acquire a book data item including a plurality of image data items related to covers and individual pages of the book;
    acquiring, with an information processing apparatus, the book data item including the plurality of image data items related to the covers and individual pages of the book acquired by the scanner;

acquiring, with the information processing apparatus, a longitudinal length and a lateral length of the book based on lengths of two sides of the plurality of image data items included in the book data item;

comparing, with the information processing apparatus, the longitudinal and lateral lengths of the book to the lengths of the two sides of each of the image data items to determine the image data item as including a spine image when the image data item is neither one page nor two facing pages, wherein the spine image is identifying an external spine on a cover of the book;

specifying, with the information processing apparatus, based on the lateral length of the book, a region of the spine image in the image data item including the spine image; and cutting out, with the information processing apparatus, the specified region from the image data item including the spine image to acquire the image data item of the spine.

11. A non-transitory computer-readable medium recording thereon a program for causing a computer to function as:

a book data acquisition unit which acquires, from a scanner that scans a book to produce image data, a book data item including a plurality of image data items related to covers and individual pages of a book;

a length acquisition unit which acquires a longitudinal length and a lateral length of the book based on lengths of two sides of the plurality of image data items included in the book data item;

an image data determination unit which compares the longitudinal and lateral lengths of the book to the lengths of the two sides of each of the image data items to determine the image data item as including a spine image when the image data item is neither one page nor two facing pages, wherein the spine image is identifying an external spine on a cover of the book;

specifying based on the lateral length of the book, a region of the spine image in the image data item including the spine image; and cutting out the specified region from the image data item including the spine image to acquire the image data item of the spine.

* * * * *